United States Patent [19]

Giampalmi, Jr. et al.

[11] 3,730,347
[45] May 1, 1973

[54] DRY CLEANING SOLVENT FILTER

[75] Inventors: John J. Giampalmi, Jr., Midland; William G. Oldford, Lexington, both of Mich.

[73] Assignee: The Dow Chemical Company, Midland, Mich.

[22] Filed: Nov. 22, 1971

[21] Appl. No.: 200,844

[52] U.S. Cl............................210/266, 210/282
[51] Int. Cl.........................B01d 27/02, B01d 27/04
[58] Field of Search........................55/516, 518, 519; 210/266, 282, 457, 497

[56] References Cited

UNITED STATES PATENTS

| | | | |
|---|---|---|---|
| 3,189,179 | 6/1965 | McMichael | 210/266 X |
| 3,263,812 | 8/1966 | Hartley | 210/282 X |
| 3,493,117 | 2/1070 | Tuffnell et al. | 210/282 X |
| 2,537,992 | 1/1951 | Gross et al. | 55/498 |
| 2,557,557 | 6/1951 | Newcum | 210/282 |

Primary Examiner—Samih N. Zaharna
Assistant Examiner—R. H. Spitzer
Attorney—William M. Yates et al.

[57] ABSTRACT

An improved dry cleaning solvent filter cartridge comprising for the greater part conventional filter cartridge configuration and construction, i.e., an outer tubular element of accordion plaited filter paper and an inner tubular bed of activated charcoal all enclosed in a perforated outer cylindrical metal shell with a perforated concentric center tube serving as the filtered solvent outlet, contains a perforated unidirectional lockable annular metal retainer on the top of the charcoal bed and a cooperating locking section in either or both tubular walls of the charcoal bed, said retainer locking in place when pressed down on the bed by engagement between one or both of its inner and outer peripheral edges and inward projections on the corresponding wall or walls holding the charcoal bed.

4 Claims, 3 Drawing Figures

PATENTED MAY 1 1973  3,730,347

INVENTORS.
John J. Giampalmi, Jr.
BY  William G. Oldford

D. H. Thurston
AGENT

3,730,347

DRY CLEANING SOLVENT FILTER

BACKGROUND OF THE INVENTION

The present invention relates to a dry cleaning apparatus, more particularly to an improved disposable cartridge filter for filtering and conditioning dry cleaning solvent.

The increased use of self-service dry cleaning machines has made it necessary to provide inexpensive yet efficient filters and solvent conditioning units which can remove both suspended particulate matter and dissolved dyes or other substances from the dry cleaning solvent as it is circulated through the machine. Filtration is accomplished with a cloth or paper filter element while dissolved substances are usually removed by passing the contaminated solvent through a bed of granular adsorbent such as activated charcoal. Conventionally, the two elements are combined in a solvent filtering and conditioning cartridge whereby the solvent first passes through an outer tubular accordionplaited filter paper unit, then flows through a concentric tubular bed of activated charcoal and into a perforated central outlet tube. The solvent can be a halogenated aliphatic hydrocarbon such as perchloroethylene or 1,1,2-trichloro-1,2,2-trifluoroethane or a hydrocarbon of the Stoddard solvent type.

Such a cartridge provides efficient treatment for the solvent. However, because the filter cartridge is subjected to jostling when shipped and to turbulence in the bed of charcoal during use, both of which actions cause abrasion of the relatively soft carbon granules, fine particles of carbon become suspended in the outlet stream of purified solvent, even though the outlet stream is usually passed through a cloth screen which retains the charcoal bed. Thus, charcoal is lost from the bed and is sometimes distributed on the clothing being cleaned. As charcoal is lost by such abrasion, turbulence in the bed of granules caused by the flow of cleaning solvent during use increases and the abrasion process accelerates, materially shortening the life of the filter.

SUMMARY OF THE INVENTION

It has now been found that such abrasion of the charcoal granules and loss of fines to the effluent purified solvent in a filter cartridge as described is substantially reduced or even largely eliminated by holding the packed bed of charcoal firmly in place under a positive compressive force. Such a positive compressive force is provided by a perforated metal, substantially annular shaped retainer fitting over the top of the charcoal bed and locking in place when pressed down on the charcoal by engagement of one or both of the outer and inner peripheral edges of the retainer with locking projections on the corresponding wall or walls of the charcoal bed chamber. Preferably, a compressible, solvent-permeable annular pad of jute fiber, plastic fibers, or other such material is positioned between the retainer and the top of the charcoal bed.

DRAWINGS AND DETAILED DESCRIPTION

Figure 2:
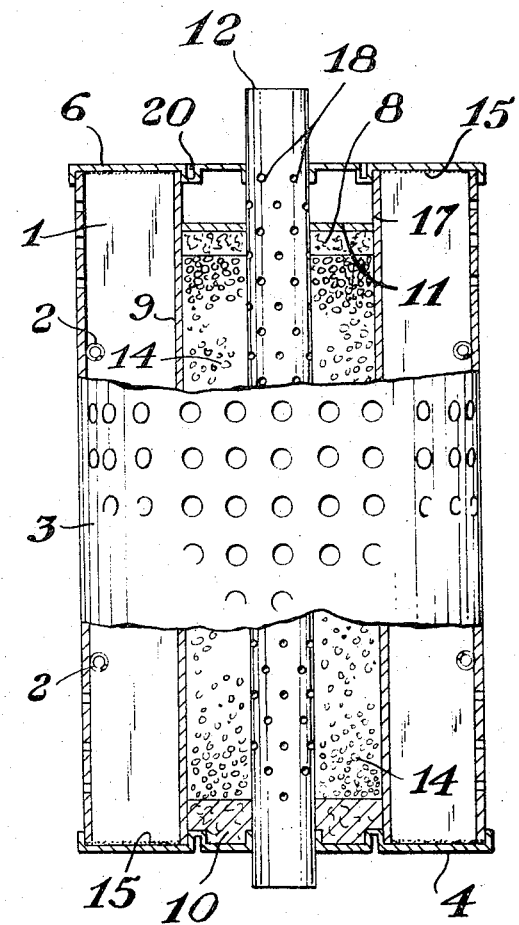
FIG. 2 is a partial, diametrical, side sectional view of the assembled filter cartridge.
Figure 3:
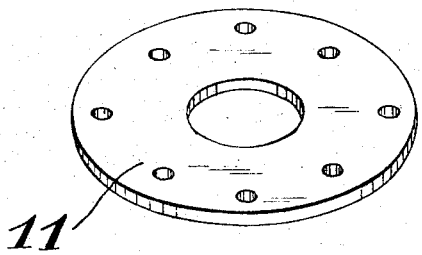
FIG. 3 is a view in detail of one embodiment of the annular retainer.

Referring to FIG. 2, the accordion-plaited filter paper cylinder 1 is enclosed in a perforated metal shell 3 with holes in the shell distributed over the entire shell so as to provide free flow of solvent through the shell and the filter paper element. Normally, the filter paper 1 is impregnated with the insoluble heat-curable resin such as a phenol-formaldehyde condensate to provide added strength and rigidity. The ends of the tubular filter paper element are sealed to the lower and upper covers 4 and 6 by adhesive bonds 15 using an adhesive such as a polyvinyl chloride plastisol. The impregnating resin and the adhesive seal can then be cured by baking the assembled cartridge in an oven before use. In order to hold apart the folds in the filter paper and to keep the outer edges from rubbing against the inner wall of shell 3, a plurality of fold-separating means 2 encircle the filter paper element. These means can be beads of the same resin used to impregnate and seal the ends of the filter element or, preferably, they can be circles of helical spring 2 where the coils of the spring serve to separate the folds and keep them from contact with the inner wall of shell 3.

Figure 1:
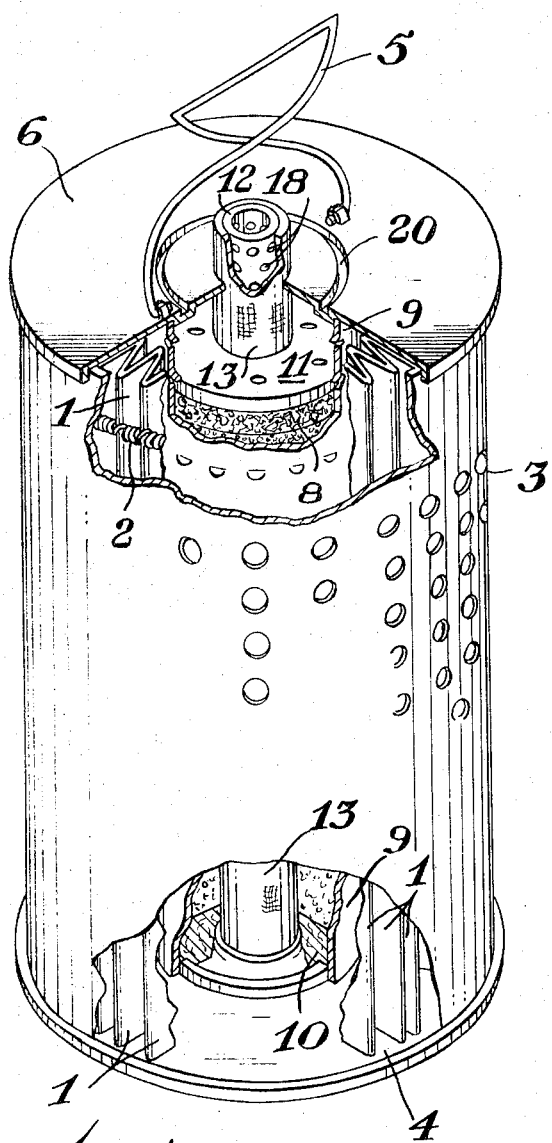
FIG. 1 is a partially cut away isometric view of a preferred embodiment of the filter cartridge assembly of this invention.

The perforated support tube 9 fits within the filter element 1 and is held in place by the top and bottom covers 6,4 and the intermediate flanges 20 in the covers. The support tube 9 is perforated over essentially its entire surface to allow free passage of filtered solvent into the bed of charcoal 14, with a relatively narrow rim of imperforate metal at each end for manufacturing purposes. In a preferred embodiment, the holes near the top end of the support tube 9 are made with the upper edges projecting inwardly toward the center to form locking projections 17 which engage with the outer peripheral edge of the annular retainer insert 11 and hold the insert 11 firmly in place, see also FIG. 1. Preferably, compressible annular pads 8 and 10 are positioned between the retainer insert 11 and the top of the charcoal bed 14 and optionally also between the bottom of the bed 14 and the lower cover 4. Pads of jute fiber, polypropylene fiber, or other such materials which are inert to solvent and loosely enough packed to be readily permeable by the solvent are suitable.

The perforated center tube 12 fits concentrically within the support tube 9 and is held in place by the annular inwardly extending lip of upper and lower lids 6 and 4 respectively. That part of the center tube 9 which is in contact with the charcoal bed is covered by a cloth sleeve 13 which prevents charcoal granules from passing through the tube wall perforations and into the effluent solvent stream. The sleeve 13 is desirably made of an inert plastic cloth such as Saran cloth or cloth of nylon or Orlon fiber. In an optional embodiment of the invention, the perforations 18 in the top of the center tube are made with upper edges protruding outwardly from the tube to serve as locking projections which can engage the inner peripheral edge of the annular retainer insert 11.

Optionally, for convenience in assembly, resin curing, or the like, the top and bottom end covers or lids can be two piece covers wherein the intermediate flange 20 in each cover is constituted by the junction of the radially inner peripheral edge of the cover and the edge of a removable concentric inside annular cover.

Such inside annular cover can be frictionally engaged in place with a rolled edge, as a paint can lid, by an interference fit, as a snap ring lock, by a screw type engagement, or other suitable locking or fastening means.

In another embodiment, the filter cartridge contains a second annular retainer insert disposed between the permeable annular pad holding the bottom of the charcoal bed and the bottom end cover. Such second retainer insert may be held in place by locking engagement of one or both of its peripheral edges in the same way as described for the first or top insert.

The charcoal in the annular adsorbent bed can be any activated charcoal such as coconut shell charcoal, bone charcoal, or wood charcoal of suitably sized granules, for example, about 4–8 mesh. The charcoal is, of course, advantageously substantially free of fines when first loaded into the filter cartridge.

We claim:

1. In a dry cleaning solvent filter cartridge comprising a cylindrical perforated metal outer shell having upper and lower annular end covers, a tubular accordian-plaited filter paper unit contained by said outer shell and end covers, a perforated metal support tube fitting concentrically within said filter paper unit and extending between said end covers, a perforated metal central tube concentrically disposed within said support tube, the ends of said central tube fitting closely within the inner peripheral edges of said annular end covers, said central tube, support tube, and end covers defining between them an annular chamber, a bed of granular activated carbon largely filling said chamber, and top and bottom compressible, solvent-permeable annular pads covering the top and bottom respectively of said bed, the improvement wherein an annular metal retainer is held on the top of at least said top pad by locking engagement between at least one of the inner and outer peripheral edges of said retainer and projections spaced about the circumference of the corresponding cylindrical wall of said chamber, said retainer thereby exerting a positive compressive force on the bed of granular carbon.

2. The solvent filter cartridge of claim 1 wherein a second annular metal retainer is held between the bottom solvent-permeable annular pad and the lower end cover by said locking engagement.

3. The solvent filter cartridge of claim 1 wherein the annular metal retainer on the top of said top pad is the sole such retainer.

4. The solvent filter cartridge of claim 2 wherein the upper and lower end covers are of two piece construction, each cover having a concentric inside annular portion.

* * * * *